No. 851,065. PATENTED APR. 23, 1907.
T. J. CHENEY.
FASTENER FOR TOOL HANDLES.
APPLICATION FILED JULY 18, 1906.
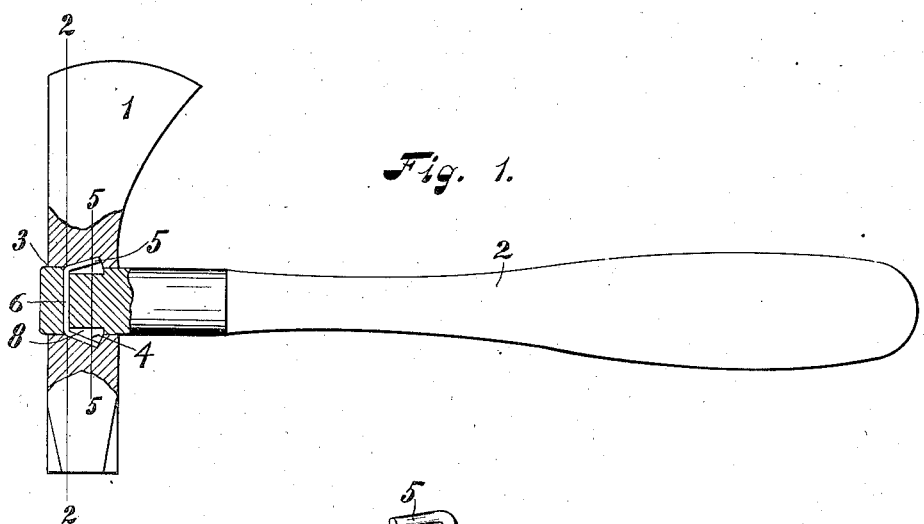
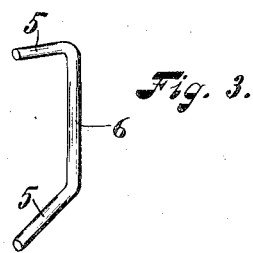
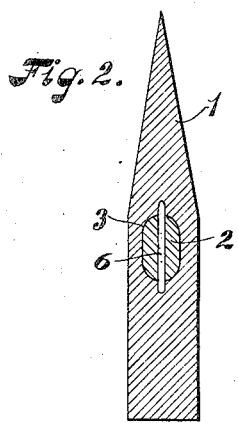
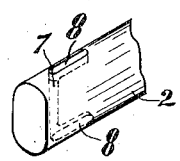
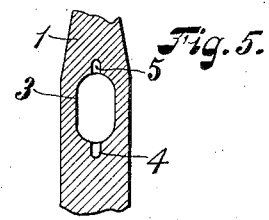
Witnesses:
Edw. Lindmueller.
Harry J. Gettins.
Inventor:
Thomas J. Cheney
By Obed C. Billman
His Attorney.

UNITED STATES PATENT OFFICE.

THOMAS J. CHENEY, OF LODI, OHIO.

FASTENER FOR TOOL-HANDLES.

No. 851,065.     Specification of Letters Patent.     Patented April 23, 1907.

Application filed July 18, 1906. Serial No. 326,674.

*To all whom it may concern:*

Be it known that I, THOMAS J. CHENEY, a citizen of the United States, residing at Lodi, in the county of Medina and State of Ohio, have invented certain new and useful Improvements in Fasteners for Tool-Handles, of which the following is a specification.

The invention relates to improvements in fasteners for tool-handles, and especially of that class of tools in which there is a handle secured in an eye,—such as hammers, axes, hatchets, and tools of similar character.

The primary object of the invention is to provide a generally improved device of this character which will be exceedingly simple in construction, cheap of manufacture, efficient in use, and much better adapted to its intended purposes than any other device of the same class with which I am acquainted.

With these ends in view, the invention consists in the novel construction, arrangement and combination of parts, hereinafter described, illustrated in the accompanying drawings, and particularly pointed out in the appended claims.

Referring to the accompanying drawings, forming a part of this specification, Figure 1, is a side view, partly in section, of a tool embodying my invention. Fig. 2, a transverse sectional view taken through line 2, 2, of Fig. 1. Fig. 3, a detail view of the improved spring-fastener. Fig. 4, a detail perspective view of the end of the handle provided with an opening and grooves or recesses on each side for the reception of said spring-fastener. Fig. 5, a cross-sectional view taken through line 5, 5, of Fig. 1.

Similar characters of reference designate like parts throughout all the figures of the drawings.

The tool body 1, and the handle 2, may be of the usual construction, but the eye 3, for the reception of the end of the tool handle, is provided with diametrically-opposite recesses or sockets 4, designed to take over and be engaged by spring-arms 5, of a spring-fastener 6, preferably formed of steel spring-wire, the main body portion of which passes through a transverse opening 7, of the end of the handle taking into the eye of the tool.

The spring-arms 5, are bent rearwardly, and, in order to form a seat or pocket for the same when bent at right angles to the main body portion thereof, when the handle is being driven home in the eye of the tool body preparatory to being automatically fastened and engaged within said eye, a pair of oppositely-disposed longitudinal grooves or recesses 8, are formed in the handle, as shown most clearly in Figs. 1, and 4, of the drawings.

When it is desired to insert and fasten the handle in the eye of the tool, a steel spring-wire of suitable length (preferably having one end bent to form one of the spring-arms 5) is mounted in the transverse opening 7, and bent to the form most clearly shown in Figs. 1, and 3, of the drawings, after which the handle is driven home in the eye of the tool body, the ends of the spring-arms 5, snapping into engagement with the oppositely-disposed sockets 4, of the eye as soon as they have passed the inner edges of the same, the longitudinal grooves or recesses 8, approximately registering and being in alinement with said sockets.

From the foregoing description, taken in connection with the accompanying drawings, the operation and advantages of my invention will be readily understood.

Having thus described the invention, without having attempted to set forth all the forms in which it may be made, or all the modes of its use, I declare that what I claim and desire to secure by Letters Patent is,—

1. A fastener for tool-handles, consisting of an eye formed in the body of the tool and provided with diametrically-opposite sockets, a handle taking into said eye and provided with a transverse opening and grooves extending from said opening, and a spring-fastening mounted in said transverse opening and provided with spring-arms taking into said sockets of the eye.

2. A fastener for tool-handles, consisting of an eye formed in the tool body, recesses or sockets formed within said eye, a handle mounted therein and provided with a transverse opening and grooves within said eye, and a spring-fastening mounted in said transverse opening and provided with spring-arms normally taking into said sockets and adapted to be bent within said grooves when the handle is inserted in said eye.

3. In a fastener for tool-handles, a spring-fastener having the main body portion thereof passing through the end of the handle mounted within the eye of the tool, and provided with rearwardly-extending spring-arms surrounded by and engaging the tool within said eye.

4. In a fastener for tool handles, the combination with a tool-eye provided with sockets, and a handle mounted therein and provided with a transverse opening and grooves extending rearwardly from said opening; of a spring-wire mounted in said transverse opening and provided with rearwardly-extending spring-arms normally resting within said sockets and adapted to be bent within said grooves.

In testimony whereof I have signed my name to this specification in the presence of two subscribing witnesses.

THOMAS J. CHENEY.

Witnesses:
O. C. BILLMAN,
H. T. GETTINS.